United States Patent
Tsang et al.

(10) Patent No.: US 11,428,869 B2
(45) Date of Patent: Aug. 30, 2022

(54) MULTIMODE WAVEGUIDE GRATING COUPLER

(71) Applicant: The Chinese University of Hong Kong, Hong Kong (CN)

(72) Inventors: Hon Ki Tsang, Hong Kong (CN); Yeyu Tong, Tongcheng (CN)

(73) Assignee: The Chinese University of Hong Kong, Hong Kong (CN)

( * ) Notice: Subject to any disclaimer, the term of this patent is extended or adjusted under 35 U.S.C. 154(b) by 114 days.

(21) Appl. No.: 16/844,137

(22) Filed: Apr. 9, 2020

(65) Prior Publication Data
US 2020/0333535 A1 Oct. 22, 2020

Related U.S. Application Data

(60) Provisional application No. 62/837,042, filed on Apr. 22, 2019.

(51) Int. Cl.
*G02B 6/34* (2006.01)
*H04B 10/25* (2013.01)
*H04B 10/27* (2013.01)
*H04J 14/04* (2006.01)
*H04B 10/2581* (2013.01)

(52) U.S. Cl.
CPC .............. *G02B 6/34* (2013.01); *H04B 10/25* (2013.01); *H04B 10/2581* (2013.01); *H04B 10/27* (2013.01); *H04J 14/04* (2013.01)

(58) Field of Classification Search
CPC . G02B 6/34; G02B 6/124; G02B 6/14; G02B 6/30; G02B 6/1228; H04B 10/25; H04B 10/2581; H04B 10/27; H04J 14/04
See application file for complete search history.

(56) References Cited

U.S. PATENT DOCUMENTS

2009/0290837 A1 11/2009 Chen et al.
2016/0306115 A1* 10/2016 Koonen ............... G02B 6/2773

FOREIGN PATENT DOCUMENTS

WO WO-2016197376 A1 * 12/2016 ......... G02B 6/12004

OTHER PUBLICATIONS

High efficiency Silicon-on-Insulator grating coupler based on a poly-Silicon overlay, Opt. Express 14, 11622-11630 (Year: 2006).*

(Continued)

*Primary Examiner* — Leslie C Pascal
(74) *Attorney, Agent, or Firm* — Kilpatrick Townsend & Stockton LLP

(57) ABSTRACT

We describe a high coupling-efficiency waveguide grating coupler for use in the optical interface between a planar multimode waveguide and a multimode optical fiber in mode division multiplexed optical communication systems. The multimode waveguide grating coupler can launch light from the different modes of the planar waveguide into the different modes of the multimode optical fiber and vice-versa. A silicon based multimode waveguide grating coupler was used to couple two polarizations of a multimode silicon waveguide into the LP01 mode and LP11 mode from a step index multi-mode fiber (MMF). Simulations of the preliminary design predicted the coupling efficiency to be −4.3 dB for LP01 mode and −5.0 dB for the LP11 mode. Experimental coupling efficiency of −4.9 dB and −6.1 dB were obtained for LP01 and LP11, respectively. The multiplexer can be passive.

20 Claims, 7 Drawing Sheets

(56) References Cited

OTHER PUBLICATIONS

Chen, et al., "Nanoholes Grating Couplers for Coupling Between Silicon-on-Insulator Waveguides and Optical Fibers," Photonics Journal, IEEE., vol. 1, No. 3, pp. 184-190 (Sep. 2009).

Chen, et al., "Two dimensional silicon waveguide chirped grating couplers for vertical optical fibers," Optics Communications, vol. 283, pp. 2146-2149 (2010).

Dai, et al., "Silicon mode (de)multiplexer enabling high capacity photonic networks-on-chip with a single-wavelength-carrier light," Optics Letters, vol. 38, No. 9, pp. 1422-1424 (May 2013).

Dai, et al., "10-Channel Mode (de)multiplexerwith Dual Polarizations," Lasers Photonics Review, vol. 12, 1700109, 9 pages (2018).

Ding, et al., "On-chip mode multiplexer based on a single grating coupler," IEEE Photonics Conference, pp. 707-708 (2012).

Ding, et al., "Silicon Photonic Integrated Circuit Mode Multiplexer," IEEE Photonics Technology Letters, vol. 25, No. 7, pp. 648-651 (Apr. 2013).

Ding, et al., "Efficient silicon PIC mode multiplexer using grating coupler array with aluminum mirror for few-mode fiber," CLEO: 2015, OSA Technical Digest, Optical Society of America, 2 pages (2015).

Fontaine, et al., "Space-division multiplexing and all-optical MIMO demultiplexing using a photonic integrated circuit," OFC/NFOEC, pp. 1-3 (2012).

Koonen, et al., "Silicon Photonic Integrated Mode Multiplexer and Demultiplexer," IEEE Photonics Technology Letters, vol. 24, No. 21, pp. 1961-1964 (Nov. 2012).

Ryf, et al., "Mode-Division Multiplexing Over 96 km of Few-Mode Fiber Using Coherent 6×6 MIMO Processing," Journal of Lightwave Technology, vol. 30, No. 4, pp. 521-531 (Feb. 2012).

Wohlfeil, et al., "A Two-Dimensional Fiber Grating Coupler on SOI for Mode Division Multiplexing," IEEE Photonics Technology Letters, vol. 28, No. 11, pp. 1241-1244 (Jun. 2016).

Wu, et al., "3×104 GB/s Single-λ Interconnect of Mode-Division Multiplexed Network With a Multicore Fiber," Journal of Lightwave Technology, vol. 36, No. 2, pp. 318-324 (Jan. 2018).

\* cited by examiner

*Side view*

*Top view*

MULTIMODE WAVEGUIDE GRATING COUPLER

CROSS REFERENCE TO RELATED APPLICATIONS

This application claims priority to U.S. Provisional Application No. 62/837,042, filed on Apr. 22, 2019, the disclosure of which is incorporated by reference in its entirety for all purposes.

BACKGROUND OF THE INVENTION

Optical communication uses light to convey information. Data centers and communication across the Internet rely heavily on optical-fiber communication.

In 2012, Ryf demonstrated the use of mode division multiplexing in multimode optical fibers by using an arrangement of beam splitters, mirror phase plates (spatial light modulators) and lenses to couple light from six single-mode fibers into a multimode fiber. R. Ryf et al., "Mode-Division Multiplexing Over 96 km of Few-Mode Fiber Using Coherent 6×6 MIMO Processing," Journal of Lightwave Technology, vol. 30, no. 4, pp. 521-531, February 2012. The theoretical best coupling efficiency for launching into the LP01 and LP11 modes of the fiber was reported to be −5.5 dB, and the experimentally realized coupling loss was reported to be −9.6 and −9 dB for LP01 and LP11 coupling respectively using free space optics.

Also in 2012, Koonen reported a combination of integrated photonic elements to launch light from a single mode silicon waveguide into the LP11 mode of a multimode fiber. A. M. J. Koonen, H. Chen, H. P. A. van den Boom, and O. Raz, "Silicon Photonic Integrated Mode Multiplexer and Demultiplexer," IEEE Photonics Technology Letters, vol. 24, no. 21, pp. 1961-1964, November 2012. The device comprised the integration of a waveguide 3 dB splitter to separate out the light into two separate single-mode waveguides, which were connected to two different waveguide grating couplers positioned within a diameter of a multimode optical fiber. Precise phase control by integrated waveguide heaters were employed to ensure that there were about 180 degrees phase difference for the light arriving at the two single mode waveguide grating couplers. The experimentally demonstrated coupling efficiency to the LP01 mode using this scheme was −20 dB and about −25 dB for the LP11 mode.

In 2013, Ding described a more advanced version of Koonen's approach and used a 1×4 splitter with four single-mode waveguides connected to four 5 µm wide waveguide grating couplers, all located within the diameter of the core of a multimode fiber, to launch light from a single mode waveguide into the multimode fiber. Y. Ding, H. Ou, J. Xu, and C. Peucheret, "Silicon Photonic Integrated Circuit Mode Multiplexer," IEEE Photonics Technology Letters, vol. 25, no. 7, pp. 648-651, April 2013. The single-mode waveguide grating couplers were formed by a pattern of subwavelength etched holes. The coupling efficiencies into the LP01, LP11 modes were reported to be between −23 dB and −25 dB.

Fontaine reported another arrangement of multiple single mode waveguides and heaters to control the optical phase arriving at an array of large waveguide grating couplers for launching light into the different LP modes of a few mode fiber. N. K. Fontaine et al., "Space-division multiplexing and all-optical MIMO demultiplexing using a photonic integrated circuit," in OFC/NFOEC, 2012, p. PDP5B.1. As the waveguide grating couplers were larger than the diameter of the optical fiber, a lens was used to image the diffracted output from the gratings onto the multimode fiber. Coupling efficiency was only about −35 dB.

In 2016, Wohlfeil described the use of counter-propagating light from two single-mode waveguides to launch light from a wide waveguide grating coupler into a multimode fiber. B. Wohlfeil, G. Rademacher, C. Stamatiadis, K. Voigt, L. Zimmermann, and K. Petermann, "A Two-Dimensional Fiber Grating Coupler on SOI for Mode Division Multiplexing," IEEE Photonics Technology Letters, vol. 28, no. 11, pp. 1241-1244, June 2016. Active optical phase control using a heater was needed to control the phase difference of the light arriving at the grating coupler from the two single mode waveguides. Coupling efficiency of −22 dB was reported.

In 2015, Ding reported an improved version of their earlier design of an array of waveguide grating couplers. Y. Ding and K. Yvind, "Efficient silicon PIC mode multiplexer using grating coupler array with aluminum mirror for few mode fiber," paper Sth1F.1, CLEO 2015. They launched from single-mode waveguide and used waveguide heaters to control the relative optical phase from the eight waveguides at an array of four waveguide grating couplers, which launched light into a few mode fiber. Bottom aluminum mirrors underneath the waveguide gratings enhanced the coupling efficiency to −10.6 dB for coupling into the LP11 mode and −14 dB into the LP01 mode.

With a rapid growth of data traffic, there exists a need for improved optical communication systems and methods.

BRIEF SUMMARY OF THE INVENTION

This application relates to optical communication, and without limitation to spatial multiplexing using multiple modes in an optical fiber. In some embodiments, a multimode waveguide grating coupler is used to couple optical modes from a multimode planar waveguide into different modes of a multimode optical fiber. By coupling optical modes from a planar waveguide into a multimode fiber, spatial multiplexing can be used to increase communication bandwidth of an optical fiber.

In some embodiments, a dithered grating comprises a substrate; a device layer; and an insulating layer between the device layer and the substrate, wherein: the device layer comprises a plurality of teeth defining a plurality of grooves; the plurality of teeth and the plurality of grooves define a plurality of periods, wherein a period is a width of one tooth of the plurality of teeth and one adjacent groove of the plurality of grooves; and the plurality of periods have values that oscillate about an average width of the plurality of periods.

In some embodiments, a device for optical communication comprises: a waveguide configured to guide light to an output coupler, wherein: the waveguide is a multimode waveguide configured to support a fundamental mode and a first-order mode, the fundamental mode and the first-order mode are transverse modes, the waveguide has a core formed of a semiconductor material, and/or the core has a width, measured at the output coupler, equal to or greater than 15 microns and equal to or less than 100 microns; a directional coupler configured to adiabatically couple an optical signal into the first-order mode of the waveguide, wherein the directional coupler is asymmetric; and/or the output coupler comprising a grating, wherein the grating is configured to couple light of both the fundamental mode and the first-order mode out of the waveguide into an optical fiber.

In some embodiments, silicon-based spatial multiplexer comprises: a first waveguide configured to guide light to an output coupler, wherein: the first waveguide is a multimode waveguide configured to support a fundamental mode and a first-order mode, the fundamental mode and the first-order mode of the first waveguide are transverse modes, the first waveguide has a core formed of crystalline silicon, and the core of the first waveguide has a first width, measured at the output coupler, equal to or greater than 15 microns and equal to or less than 100 microns; a first directional coupler configured to adiabatically couple an optical signal into the first-order mode of the first waveguide, wherein the first directional coupler is asymmetric; a first taper between the first directional coupler and the output coupler, the first taper configured to adiabatically expand light propagating from the first directional coupler toward the output coupler; a second waveguide, wherein: the second waveguide is a multimode waveguide configured to support a fundamental mode and a first-order mode, the fundamental mode and the first-order mode of the second waveguide are transverse modes, the second waveguide has a core formed of crystalline silicon, the core of the second waveguide has a second width, measured at the output coupler, equal to or greater than 15 microns and equal to or less than 100 microns, and the second waveguide is orthogonal to the first waveguide, such that the second width is orthogonal to the first width; a second directional coupler configured to adiabatically couple an optical signal into the first-order mode of the second waveguide, wherein the second directional coupler is asymmetric; a second taper between the second directional coupler and the output coupler, the second taper configured to adiabatically expand light propagating from the second directional coupler toward the output coupler; and/or the output coupler comprising a grating, wherein: the grating comprises a layer of polycrystalline silicon contacting the core of the first waveguide, the grating comprises a plurality of walls forming holes in the core of the first waveguide, the grating is configured to couple light out of both the first waveguide and the second waveguide and into an optical fiber, and the output coupler is a vertical coupler so that light coupled out of the first waveguide and out of the second waveguide is perpendicular to beam propagation of light in the first waveguide and perpendicular to propagation of light in the second waveguide.

In some embodiments, a method for multiplexing optical signals comprises: coupling a first optical beam into a first waveguide so that the first optical beam propagates in a fundamental mode of the first waveguide; coupling a second optical beam into a second waveguide so that the second optical beam propagates in a fundamental mode of the second waveguide; coupling a third optical beam into the first waveguide, using a first asymmetric directional coupler, so that the third optical beam propagates in a higher-order mode than the fundamental mode of the first waveguide; coupling a fourth optical beam into the second waveguide, using a second asymmetric directional coupler, so that the fourth optical beam propagates in a higher-order mode than the fundamental mode of the second waveguide; out coupling the first optical beam and the third optical beam from the first waveguide into an optical fiber using a diffraction grating; and/or out coupling the second optical beam and the fourth optical beam from the second waveguide into the optical fiber using the diffraction grating, wherein the first waveguide has a width at the diffraction grating equal to or greater than 15 microns and equal to or less than 100 microns.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

Figure 1:
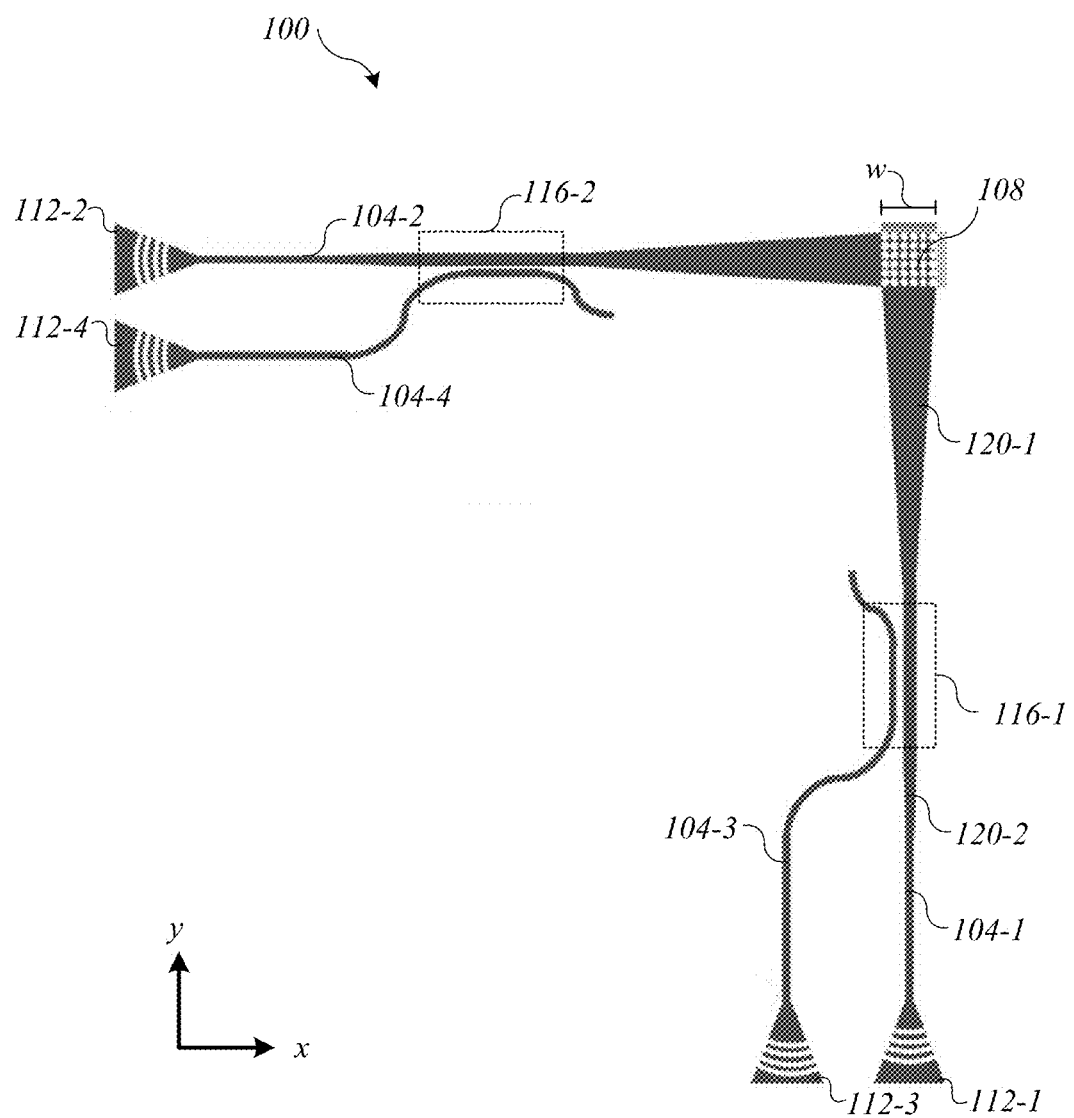
FIG. 1. A simplified diagram of an embodiment of a multiplexer.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

I. INTRODUCTION

Driven by the rapid growth of data traffic transmission capacity of standard single mode fiber (SSMF) has approached the theoretical limit imposed by the Shannon's information theory and nonlinear fiber effects. Dense wavelength-division-multiplexing, polarization multiplexing, and spectrally efficient advanced modulation formats have been exploited to increase the optical transmission capacity in SSMFs. Monolithic integration offers advantages of low cost, mass-production ability, and capability of co-integration with other integrated photonic devices such as transceivers. In 2018, Intel announced it was shipping more than a million silicon photonic based optical transceivers for the data center market. As data capacity requirements will continue to increase, it is projected that there will be a real need, driven by market demand, for higher capacity to move to spatial division multiplexing in optical communications.

Introduction of space-division multiplexing (SDM) using multi-mode fibers (MMFs) has therefore attracted much interest to enable further growth in transmission capacity and meet continued growth in data center traffic. A reliable, efficient, and/or low-cost method to excite the different fiber modes is thus highly desired for future practical applications.

Integrated diffraction gratings implemented on a silicon-on-insulator (SOI) platform is a promising candidate for coupling light between single mode planar waveguides and single mode optical fibers. Previous demonstrations include push-pull driven gratings (e.g., Koonen (2012); Ding (2013); Fontaine (2012)) and a single sub-wavelength gratings (e.g., Wohlfeil (2016); Ding (2015)). However, due to severe mode mismatch and limited directionality, the previous attempts of using waveguide grating couplers to launch light into multimode optical fibers have limited performance with typical experimental coupling efficiency reported to be less than −20 dB.

A general method to engineer an efficient mode multiplexer employing a single diffraction grating for excitation of the different linear polarized (LP) modes with high coupling efficiency is described. For example, efficient coupling into the LP01 and LP11 modes in a MMF allows four data channels including polarization diversity. Preliminary experimental embodiments of this concept demonstrated −4.9 dB and −6.1 dB coupling efficiencies into the different fiber modes. The physical embodiment of this concept is fabricated on a silicon photonics platform, and can be suitable for industrial large-volume manufacturing of photonic integrated circuits (PICs). A similar approach may be applied to other material platforms used for PICs, including InP based compound semiconductors, silica, and silicon nitride based PICs.

In some embodiments, a device is passive, does not require active control, and/or provides higher coupling efficiency than previously reported techniques (e.g., higher efficiency than using heaters to adjust phase of light coupled to different parts of a multimode fiber).

II. SAMPLE APPROACH

We described a new approach for launching light into different modes of a multimode optical fiber employing a single diffraction grating that can simultaneously launch different data channels into the LP01-x, LP01-y, LP11-x and LP11-y modes of a MMF. Coupling efficiency up to −4.3 dB is obtained in simulation with a mode-dependent loss of 0.7 dB. Experimental coupling efficiency of −4.9 dB and −6.1 dB is demonstrated respectively for two polarizations of the LP01 mode and the LP11 mode. This is the first experimental demonstration of such high-efficiency four-channel mode multiplexer for MMFs using an integrated grating coupler. Some embodiments do not require precise optical phase control using heaters. The demonstrated mode multiplexer can be suitable for future applications with MMFs in space-division-multiplexing networks.

Referring first to FIG. 1, a simplified diagram of an embodiment of a multiplexer 100 is shown. The multiplexer 100 is a device that can be used for optical communication. The multiplexer 100 comprises a first waveguide 104-1 and an output coupler 108. The first waveguide 104-1 is configured to guide light to the output coupler 108. The first waveguide 104-1 is a multimode planar waveguide configured to support a fundamental mode and at least one or more higher-order modes above the fundamental mode (e.g., the waveguide is configured to support the fundamental mode and a first-order mode). The fundamental mode and one or more higher-order modes are transverse modes of the first waveguide 104-1. A core of the waveguide 104 is made of a semiconductor material (e.g., crystalline silicon, GaAs, InP, etc.). The core of the first waveguide 104-1 has a width w, measured at the output coupler 108, equal to or greater than 15 microns and equal to or less than 100 microns. The width w allows for more efficient out coupling of light in multiple modes from out of the first waveguide 104-1 and into an optical fiber. The output coupler 108 is configured to couple light of both the fundamental mode and one or more higher-order modes out of the first waveguide 104-1 and into the optical fiber.

The multiplexer 100 comprises a second waveguide 104-2, which is similar to the first waveguide 104-1, except the second waveguide 104-2 is oriented orthogonally to the first waveguide 104-1 (e.g., 90 degrees plus or minus 1, 3, 5, or 10 degrees). The second waveguide 104-2 is a multimode planar waveguide and configured to guide light to the output coupler 108.

A first input 112-1 is used to couple light (e.g., single-mode light) into the first waveguide 104-1. A second input 112-2 is used to couple light (e.g., single-mode light) into the second waveguide 104-2. A third input 112-3 is used to couple light (e.g., single-mode light) into a third waveguide 104-3. A fourth input 112-4 is used to couple light (e.g., single-mode light) into a fourth waveguide 104-4.

A first coupler 116-1 is used to couple light from the third waveguide 104-3 into the first waveguide 104-1. A second coupler 116-2 is used to couple light from the fourth waveguide 104-4 into the second waveguide 104-2. Couplers 116 are asymmetric, directional couplers. The coupler 116 is asymmetric because widths of the first waveguide 104-1 and the second waveguide 104-2 are larger than widths of the third waveguide 104-3 and the fourth waveguide 104-4 at the coupler 116. The coupler 116 is configured to adiabatically couple single-mode light from a narrower waveguide into a higher-order mode of a wider waveguide.

A first optical beam carrying a first signal is launched (e.g., coupled) into the first waveguide 104-1; a second optical beam carrying a second signal is launched into the second waveguide 104-2; a third optical beam carrying a third signal is launched into a third waveguide 104-3; and fourth optical beam carrying a fourth signal is launched into a fourth waveguide 104-4. The third optical beam is coupled into the first waveguide 104-1 (e.g., as a first-order mode) using the first coupler 116-1, and the fourth optical beam is coupled into the second waveguide 104-2 (e.g., as a first-order mode) using the second coupler 116-2. The output coupler 108 is configured to couple the first and third optical beams out of the first waveguide 104-1, and the second and fourth optical beams out of the second waveguide 104-2, and into an optical fiber. The multiplexer 100 can be used in reverse to be a demultiplexer (e.g., receiving four signals from an optical fiber and outputting one signal to each of the four inputs 112-1, 112-2, 112-3, and 112-4).

The first waveguide 104-1 comprises a first taper 120-1 (and so does the second waveguide 104-2 similarly) to adiabatically expand light from the first coupler 116-1 to the output coupler 108. The first taper 120-1 is symmetrical.

The output coupler 108 is configured to selectively couple light propagating in different modes of a multimode planar waveguide into different modes of a multimode optical fiber. The first taper 120-1 is used to expand a width of the core of the first waveguide 104-1. In some embodiments, expansion of a width of a multimode waveguide (e.g., expanding the width of the first waveguide 104-1 to width w) can be used to reduce differences in propagation constants of different order modes, and thus enable the output coupler 108 to diffract the different modes of the multimode waveguide into a multimode fiber. Different modes of the multimode planar waveguide are coupled into different modes of a multimode fiber using the output coupler 108. For example, the output coupler 108 is configured to launch light in the fundamental mode of the first waveguide 104-1 (e.g., TE0 mode) into the fundamental mode of an optical fiber (e.g., LP01 mode), and simultaneously launch the first order mode of the first waveguide 104-1 (e.g., TE01 mode) into the first mode of the optical fiber (e.g., LP11). For demultiplexing, light from the optical fiber is coupled into the first waveguide 104-1 by the output coupler 108.

The first waveguide 104-1 and the second waveguide 104-2 are oriented orthogonally to each other to so that light is launched from the first waveguide 104-1 and the second waveguide 104-2 into orthogonal modes of the multimode fiber (and the reverse launch from the multimode fiber to the first waveguide 104-1 and the second waveguide 104-2 for demultiplexing). The output coupler 108 is configured to couple the fundamental mode and the first-order mode out of the first waveguide 104-1 (and similarly the second waveguide 104-2) with an efficiency equal to or greater than −9, −8, −7, or −6.5 dB.

The first waveguide 104-1 (and similarly the second waveguide 104-2) has a second taper 120-2. The second taper 120-2 is an adiabatic taper that expands a width of the first waveguide 104-1 from the first input 112-1 to the first coupler 116-1. Light from the first input 112-1 is input into a single-mode portion of the first waveguide 104-1 (e.g., the portion between the first input 112-1 and the second taper 120-2) and then expanded (the width of the first waveguide 104-1 getting wider) by the second taper 120-2 so that light from the third waveguide 104-3 can be coupled into a higher-order mode of the first waveguide 104-1 by the first coupler 116-1.

Figure 2:
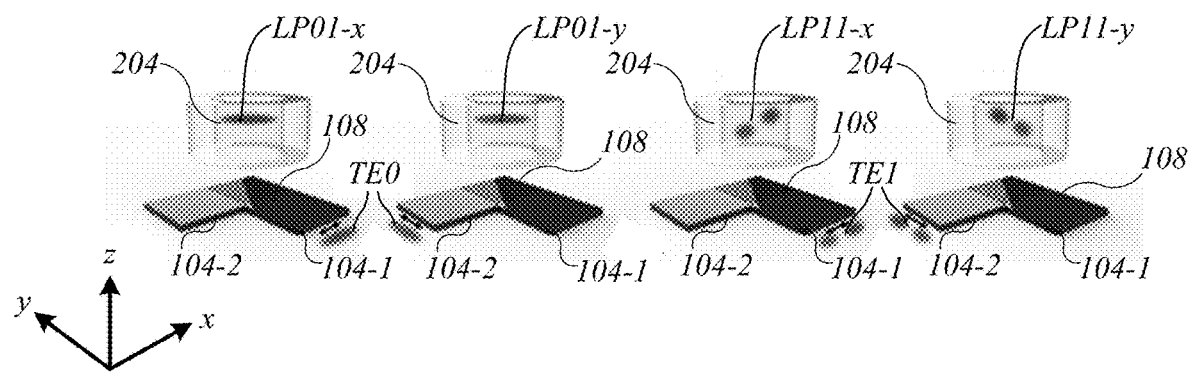
FIG. 2. Schematic diagrams of mode excitation in a multimode fiber via a waveguide grating.

In FIG. 2, schematic diagrams show mode excitations in a multimode fiber via the output coupler 108. Light from the first waveguide 104-1 and the second waveguide 104-2 are coupled into an optical fiber 204 by the output coupler 108. FIG. 2 depicts the TE0 mode of the first waveguide 104-1 being coupled into the LP01-x mode of the optical fiber 204; the TE0 mode of the second waveguide 104-2 being coupled into the LP01-y mode of the optical fiber 204; the TE1 mode of the first waveguide 104-1 being coupled into the LP11-x mode of the optical fiber 204; and the TE1 mode of the second waveguide 104-2 being coupled into the LP11-y mode of the optical fiber 204. Light in the first waveguide 104-1 is polarized in the x-direction, and light in the second waveguide 104-2 is polarized in the y-direction. Efficient coupling of modes TE0 and TE1 is possible because difference between effective refractive index is small in a wide slab waveguide of the output coupler 108.

The optical fiber 204 is a polarization-maintaining fiber (e.g., so that signals can be demultiplexed at an opposite end of the optical fiber 204). In some embodiments, the optical fiber 204 is not a polarization-maintaining fiber, and polarizations of different signals can be descrambled using digital-signal processing. In some embodiments, the optical fiber 204 supports only a few optical modes (e.g., between two and ten). In some embodiments, the optical fiber 204 is a multimode fiber supporting many modes (e.g., a 50 micron core with a wavelength of light around 1.55 microns). Applicant has found that multimode fibers can be used to guide signals multiplexed by methods and systems disclosed herein.

The output coupler 108 is a vertical coupler so that light coupled out of the first waveguide 104-1 and out of the second waveguide 104-2 is perpendicular to beam propagation of light in the first waveguide 104-1 and perpendicular to propagation of light in the second waveguide 104-2. For example, light propagates in the first waveguide 104-1 in the y-direction; light propagates in the second waveguide 104-2 in the x-direction; and the output coupler 108 couples light out of the first waveguide 104-1 and out of the second waveguide 104-2 to propagate in the z-direction to couple with the optical fiber 204.

Figure 3:
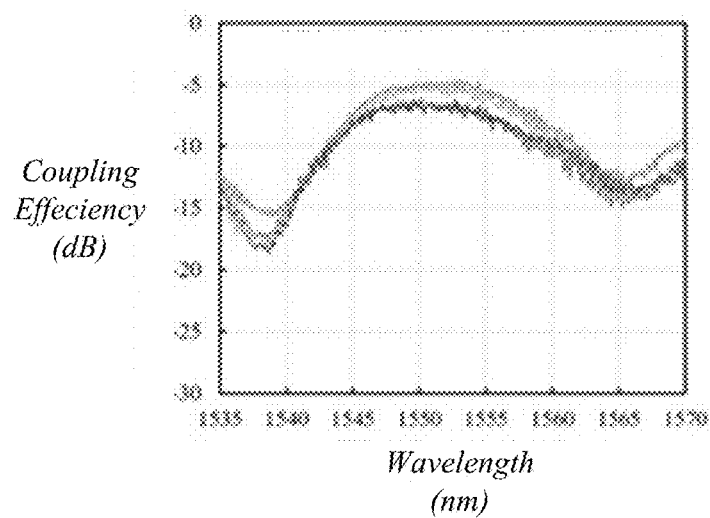
FIG. 3. A chart of experimental coupling efficiencies of a grating coupler.

FIG. 3 is a chart of experimental coupling efficiencies of an output coupler. FIG. 3 was obtained by experimental coupling of light from TE0 and TE1 modes of planar waveguides into modes LP01-x, LP01-y, LP11-x, and LP11-y of an optical fiber (e.g., using output coupler 108 in FIG. 1). The TE0 mode has a simulated coupling efficiency of −4.3 dB (36.8%). The TE1 mode has simulated a coupling efficiency of −5.0 dB (31.8%) at 1542 nm. An experimental coupling efficiency of −4.9 dB is obtained for LP01-x and LP01-y modes; and LP11-x and LP11-y modes have an experimental coupling efficiency of −6.1 dB. Accordingly, in some embodiments a grating of the output coupler is configured to couple both the fundamental mode and the first-order mode of a planar waveguide out of the planar waveguide with an efficiency equal to or better than −6.1, −7, −8, or −10 decibels.

Figure 4:
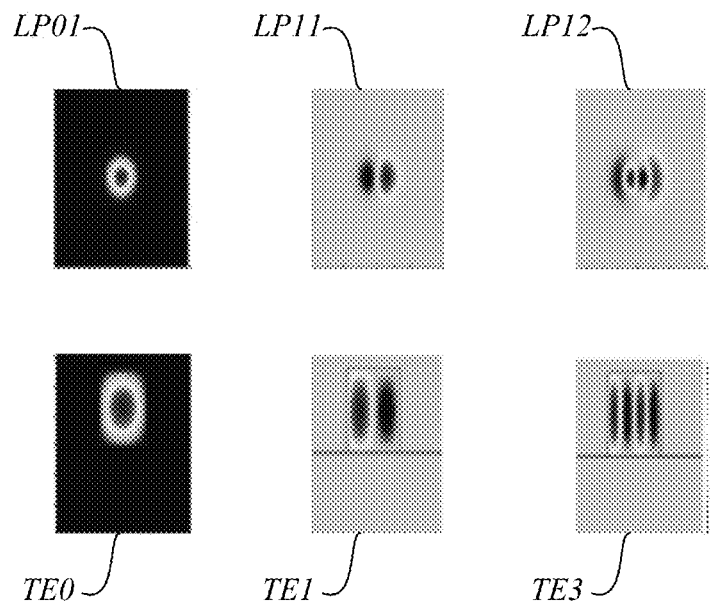
FIG. 4. Simulated field profiles of optical modes in a silicon waveguide corresponding to optical modes in an optical fiber.

FIG. 4 shows simulated field profiles of optical modes in a planar waveguide (e.g., the first waveguide 104-1 in FIG. 1) and corresponding optical modes of an optical fiber (e.g., optical fiber 204 in FIG. 2). FIG. 4 shows the profiles of the TE0, TE1, and TE3 modes of the planar waveguide and LP01, LP11, and LP22 modes of the optical fiber. The field profiles of modes of the planar waveguide are from a silicon waveguide (e.g., from the first waveguide 104-1 in FIG. 1). The field profiles of modes of the optical fiber are simulated in a graded index multimode fiber (e.g., optical fiber 204 in FIG. 2). An output coupler (e.g., output coupler 108 of FIG. 2) is configured to couple the TE0 mode into the LP01 mode; the TE1 mode into the LP11 mode; and/or the TE3 mode into the LP22 mode (and reverse for de-multiplexing).

Figure 5:
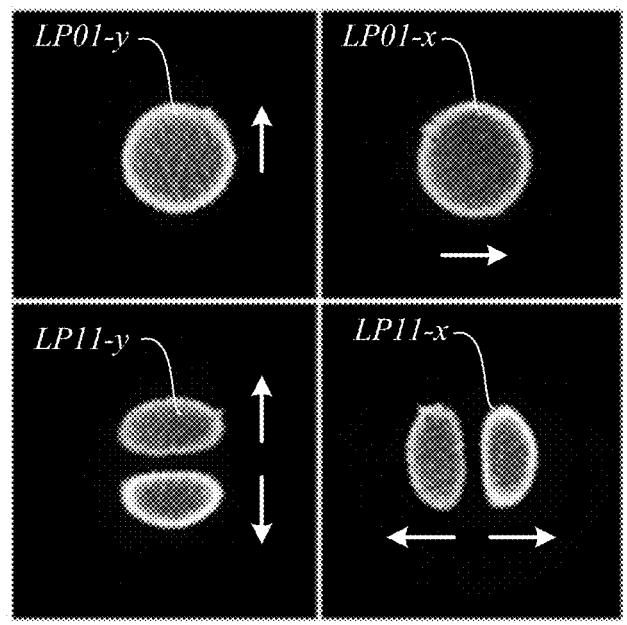
FIG. 5. A sample image of an output of a multimode optical fiber.

FIG. 5 is a sample image of modes output from a multimode optical fiber. The sample image is from infrared photographs of output images from the multimode optical fiber for light selectively launched into different modes of the optical fiber from a multiplexer (e.g., from the output coupler 108 of multiplexer 100 of FIG. 1). The photographs were acquired by an infrared camera with a 40x lens).

White arrows are added to the image to show directions of polarization for different modes. The four modes shown in FIG. 5 can be used to transmit four different optical signals to be separately detected. Though spatial and polarization multiplexing is shown, further signals (e.g., channels) can be used by other multiple-access protocols (e.g., wavelength-division multiplexing is used with spatial and polarization multiplexing to increase a number of optical channels used for optical communication).

III. SAMPLE OUTPUT COUPLER

Figure 6:
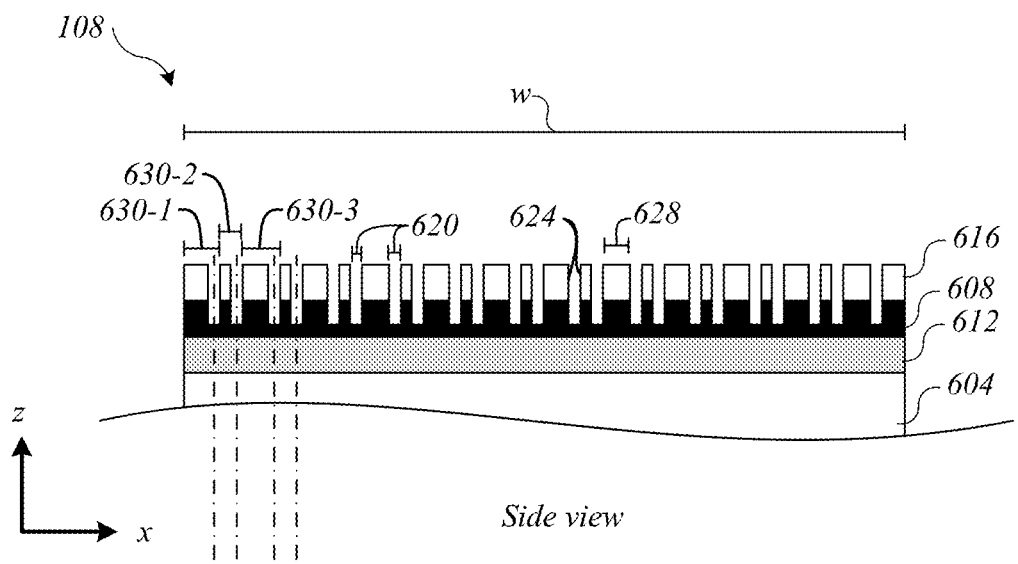
FIG. 6. A side view of an embodiment of an output coupler.

FIG. 6 is a diagram of a side view of a portion of an embodiment of an output coupler 108. The diagram is not to scale and is exaggerated to describe the output coupler 108. The output coupler 108 is formed from a silicon-on-insulator (SOI) wafer. The SOI wafer comprises a handle portion 604, a device layer 608, and an insulating layer 612 between the device layer 608 and the handle portion 604. The handle portion 604 can be made of crystalline silicon (e.g., a single crystal structure); the insulating layer 612 can be made of an oxide (e.g., silicon dioxide), and the device layer 608 can be made of crystalline silicon (e.g., a single crystal structure). An additional layer 616 can be made of polycrystalline silicon and is sometimes referred to as a polycrystalline layer. The additional layer 616 can be formed by applying an amorphous silicon layer to the SOI wafer and annealing the amorphous silicon layer to form the polycrystalline silicon layer (e.g., because silicon atoms in the amorphous silicon layer will make many crystal structures during annealing, but the many crystal structures are not aligned to form a single crystal structure). The additional layer 616 contacts that device layer 608. In some embodiments, the additional layer 616 is not used. The output coupler 108 can be fabricated in a commercial silicon photonics foundry.

The device layer 608 is also used as a core of a waveguide (e.g., the core of the first waveguide 104-1 and/or of the second waveguide 104-2). The device layer 608 has a thickness (e.g., measured in the z direction). In some embodiments, the thickness of the device layer is equal to or greater than 100 or 200 nm and/or equal to or less than 350, 400, 500, 700, or 1000 nm (e.g., the thickness of the device layer 608 is 180, 200, 220, 240, 250, 375, or 400 nm). A thickness equal to or less than 400, 500, 700, or 1000 nm can be used for efficiently coupling a fundamental optical mode into a single-mode waveguide.

Grooves 620 are formed (e.g., etched) in the additional layer 616 and/or the device layer 608. For a one-dimensional grating, the grooves 620 are trenches (e.g., extending in the y direction). For a two-dimensional grating, a groove is a repeating shape in a line (e.g., a plurality of rectangles or circles in a line). Grooves 620 are formed by walls 624 in the device layer 608 and/or the additional layer 616. The walls 624 further define a plurality of teeth, wherein a tooth 628 is between two grooves 620. An etch depth into the device layer 608 can be equal to or greater than 30 nm and equal to or less than the thickness of the device layer 608 (e.g., etch depth into the device layer 608 can be 40, 50, 70, 100, 120, 200, or 220 nm). Grooves 620 have a width (e.g., a diameter if formed by circles). The width of grooves 620 are sub-wavelength. Grooves 620 and teeth 628 form a grating of the output coupler 108.

In a single-mode waveguide, or a few mode waveguide, a grating of the output coupler 108 can be configured to couple light from of a particular mode (e.g., a fundamental transverse mode of the waveguide, TE0) but suffers higher losses for out coupling light of a different mode (e.g., a first-order transverse mode of the waveguide, TE1). By making the waveguide wide (e.g., a width equal to or larger than 15 microns and/or equal to or less than 200 microns) at the output coupler 108, light from multiple modes in one waveguide can be efficiently coupled out of the waveguide using the grating. Accordingly, the width w of the grating of the output coupler 108 is equal to or greater than 15, 20, or 30 microns and/or equal to or less than 50, 100, or 200 microns (e.g., 18, 20, 22, or 25 microns wide).

A period 630 is a distance from an end of one groove 620 to an end of an adjacent groove 620. A period 630 comprises a groove 620 and a tooth 628. In FIG. 6, a first period 630-1, a second period 630-2, and a third period 630-3 are shown. Each period 630 comprises a high refractive index portion (e.g., tooth 628), and a low refractive index portion (e.g., groove 620). Widths of periods 630 are not the same.

Figure 7:
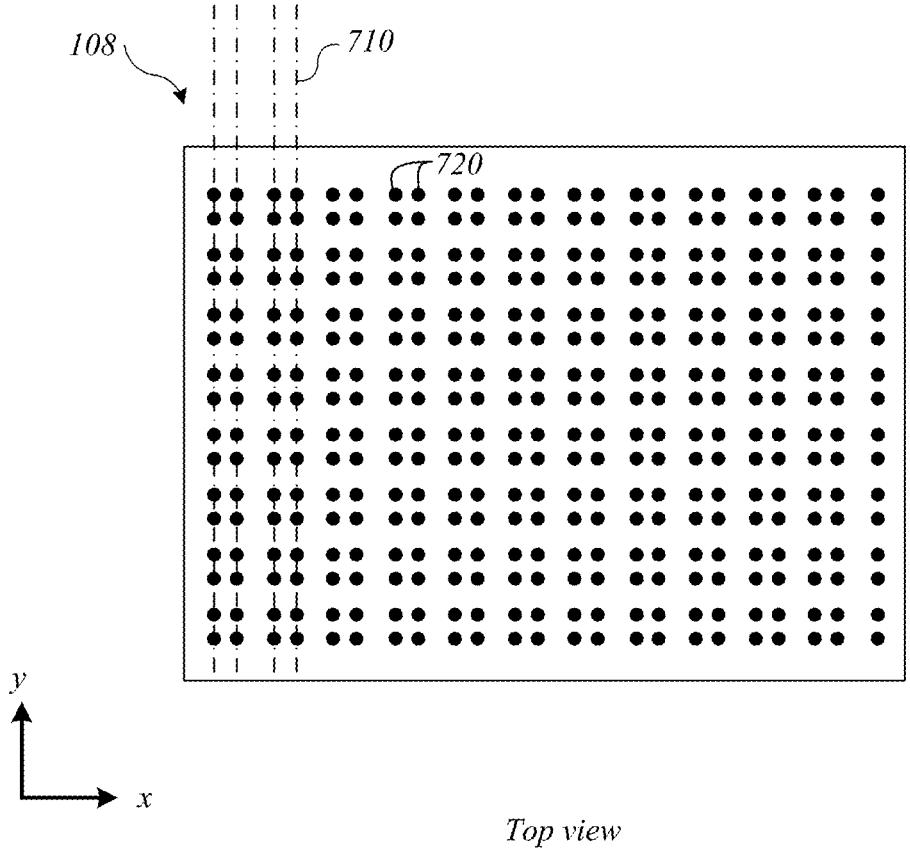
FIG. 7. A top view of an embodiment of an output coupler.

FIG. 7. A top view of the embodiment of the output coupler 108 in FIG. 6 is shown. The output coupler 108 comprises a plurality of holes 720 selectively positioned for the formation of an optical grating, which can diffract light out of a planar waveguide. The optical grating is periodic, though there can be variation in the period about a nominal mean period. Grooves can be formed in orthogonal dimensions (e.g., grooves can be formed in the y and/or the x dimensions). The optical grating can be configured for efficient launch of light from the first order (TE1) mode of a multimode planar waveguide into the LP11 mode of a multimode fiber and the simultaneous launch from the fundamental (TE0) mode of the multimode planar waveguide to the LP01 of the multimode fiber. The multimode planar waveguide may be fabricated in silicon (e.g., the core of the multimode planar waveguide is in the same layer as the device layer 608 in FIG. 6) or other high refractive index materials, including III-V compound semiconductors. Holes 720 are etched in the device layer 608 and the additional layer 616 to create the two dimensional patterned grating structure shown in FIG. 7. A line 710 of holes 720 is a groove (e.g., groove 620 in FIG. 6).

The output coupler 108 can be configured to couple both the fundamental mode and the first-order mode out of a waveguide (e.g., out of the first waveguide 104-1 and/or the second waveguide 104-2 in FIG. 1) with an efficiency equal to or greater than −9, −8, −7, or −6.5 dB. The grating can be formed by etching constant-sized air holes (e.g., holes 720) of about 322 nm diameter in a line (e.g., line 710) to form a low refractive index groove region.

The figures do not label all of the same type of features to reduce clutter on the figures. For example, not all of the grooves 620, walls 624, teeth 628, periods 630, and holes 720 in FIGS. 6 and 7 are labeled. However, a person of skill in the art will understand features that are not labeled. For example, each black circle in FIG. 7 represents a hole 720, even though only two holes 720 are labeled. Labeling each hole 720 in FIG. 7 would render FIG. 7 unreadable.

Figure 8:
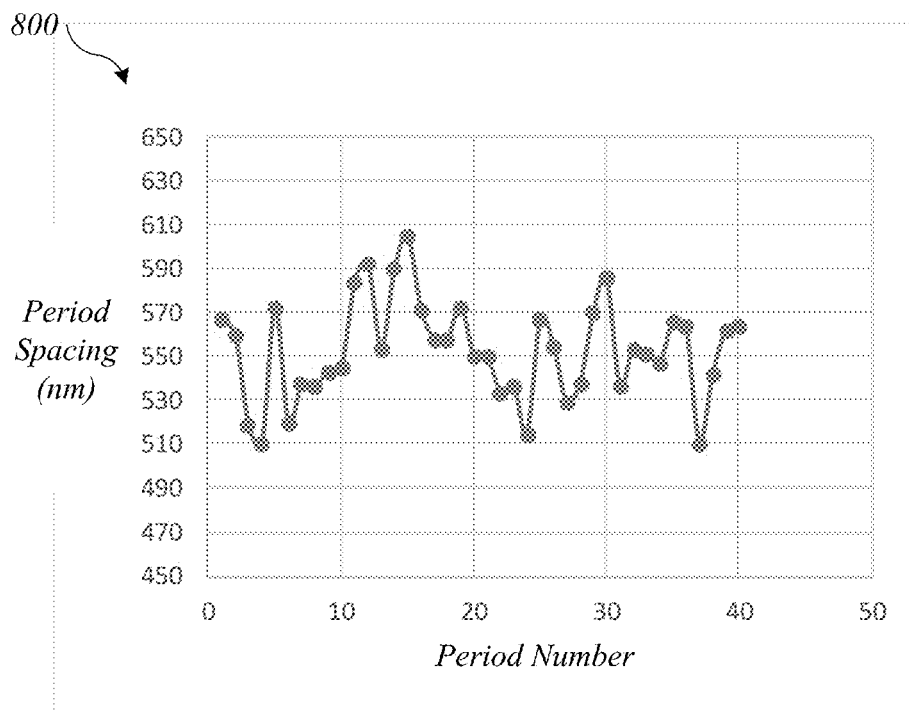
FIG. 8. A chart of periods in a dithered grating.

FIG. 8 depicts a chart 800 of period variation of an embodiment of a dithered grating. The chart 800 plots period width to period number. For example, Period Number 1 on the x axis could correspond to the first period 630-1 in FIG. 6; Period Number 2 on the x axis could correspond to the second period 630-2 in FIG. 6; and so on. However, FIG. 6 is not to scale of the chart 800.

Chart 800 shows a periodic dither, where a sequence of larger and smaller periods oscillate about an average (or mean) grating period. In chart 800, the average grating period is 553 nm. However, period widths fluctuate between a minimum period of 510 nm (Period Number 4) and a maximum period of 605 nm (Period Number 15). Thus there is a fluctuation of about +/−10% from the average period. By fluctuating periods of the grating, the output coupler can efficiently out couple both a fundamental mode and a first-order mode from a planar waveguide into an optical fiber (and vice versa).

The dithered grating is different from both a standard grating and a chirped grating. In a standard grating, widths of periods are all equal. In a chirped grating, widths of periods monotonically increase or decrease. In a dithered grating, widths of periods have a variation about an average value, wherein the variation is non-monotonic. Put another way, widths of periods of the dithered grating oscillate about an average period, and/or wherein differences between widths of periods of the dithered grating and the average period have a magnitude equal to or less than 3%, 5%, 10%, 15%, or 20% of the average period. For example, $|<P_n>-P_n|\leq 5\%$, 10%, or 15%, wherein $<P_n>$ is the average period. In chart 800, $<P_n>$=average period=553 nm; Period Number 1 is $P_1$, which has a value of 567 nm; Period Number 2 is $P_2$, which has a value of 560 nm; Period Number 3 is $P_3$, which has a value of 519 nm; and so on. The dithered grating has a period of less width between two periods of greater width (e.g., Period Number 4 is between Period Number 2 and Period Number 5, and Period Number 4 has a width less than both Period Number 2 and Period Number 5), and/or the dithered grating has a period of greater width between two periods of less width (e.g., Period Number 30 is between Period Number 27 and Period Number 32, and Period Number 30 has a width greater than both Period Number 27 and Period Number 32). In some embodiments, at least one period (e.g., at least one Pa), varies by more than 2%, 3%, 5%, or 10% from the average period.

Period variation (e.g., a dither) can be across the width of the grating or a portion of the grating (e.g., for the width w of the output coupler 108 in FIG. 1). The grating can extend across a 22 micron wide output coupler to couple light into graded index optical fiber having a diameter (e.g., core diameter) of 19.4 microns. In some embodiments, the grating is 10-20% wider than a core diameter of an optical fiber. Since sizes of holes that form grooves are the same size, groove density changes (e.g., becomes more dense and less dense) as period varies. In some embodiments, size (e.g. diameter and/or depth) of holes are changed to increase and/or decrease refractive index of the output coupler 108.

In some embodiments, a grating comprises: a substrate (e.g., from a handle portion of an SOI wafer); a device layer (e.g., crystalline silicon); and an insulating layer between the device layer and the substrate (e.g., a buried oxide layer), wherein: the device layer comprises a plurality of teeth defining a plurality of grooves; the plurality of teeth and the plurality of grooves define a plurality of periods; a period is a width of one tooth of the plurality of teeth and one groove of the plurality of grooves; and/or the plurality of periods have values that oscillate about an average width of the plurality of periods (e.g., as seen in FIG. 8). The plurality of periods can have values that are equal to or less than 3%, 5%, 10%, 15%, or 25% of the average width of the plurality of periods. Grooves (e.g., grooves 620 in FIG. 6) can be formed by a line of circles etched into the device layer (e.g., a line 710 of holes 720 form a groove 620).

IV. GENETIC OPTIMIZATION

Genetic optimization can be used to determine periods of a dithered grating. An embodiment of a genetic optimization algorithm includes six steps:
  i. Population initialization
  ii. Fitness evaluation
  iii. Termination criteria
  iv. Selection
  v. Crossover
  vi. Mutation In step i, population is initialized. An initial dither of about +/−3% can be used. Even if an initial dither is not used in the population initialization, it is found that genetic optimization can still give a solution that exhibits a dither characteristic in parts of the grating. However, starting with a dither often leads to better results more quickly and/or with less trial-and-error computing time.

In step ii, fitness of the initial population is evaluated and then compared to termination criteria, step iii. If evaluation of the population meets the termination criteria, then the algorithm is exited. If evaluation of the population does not meet the termination criteria in step iii, then the algorithm moves to selection, step iv. After selection, step iv, crossover, step v implemented and then mutation of the population, step vi. After the population is mutated in step vi to form a new population, the algorithm returns to step ii for the fitness evaluation of the new population.

By seeding the genetic optimization algorithm with a dither initial population, there remains a characteristic dither in the final structure. An example of dither of periods in a final structure is given in FIG. 8.

V. EXAMPLE MULTIPLEXER VARIATIONS

Figure 9:
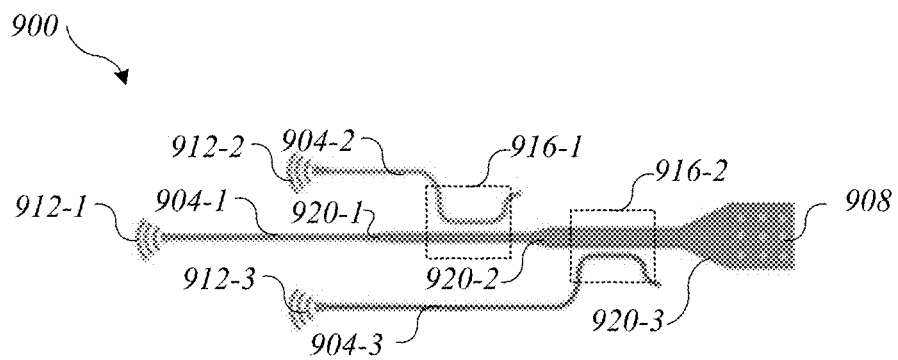
FIG. 9. A simplified diagram of an embodiment of a multiplexer having three optical signals in one waveguide.
Figure 10:
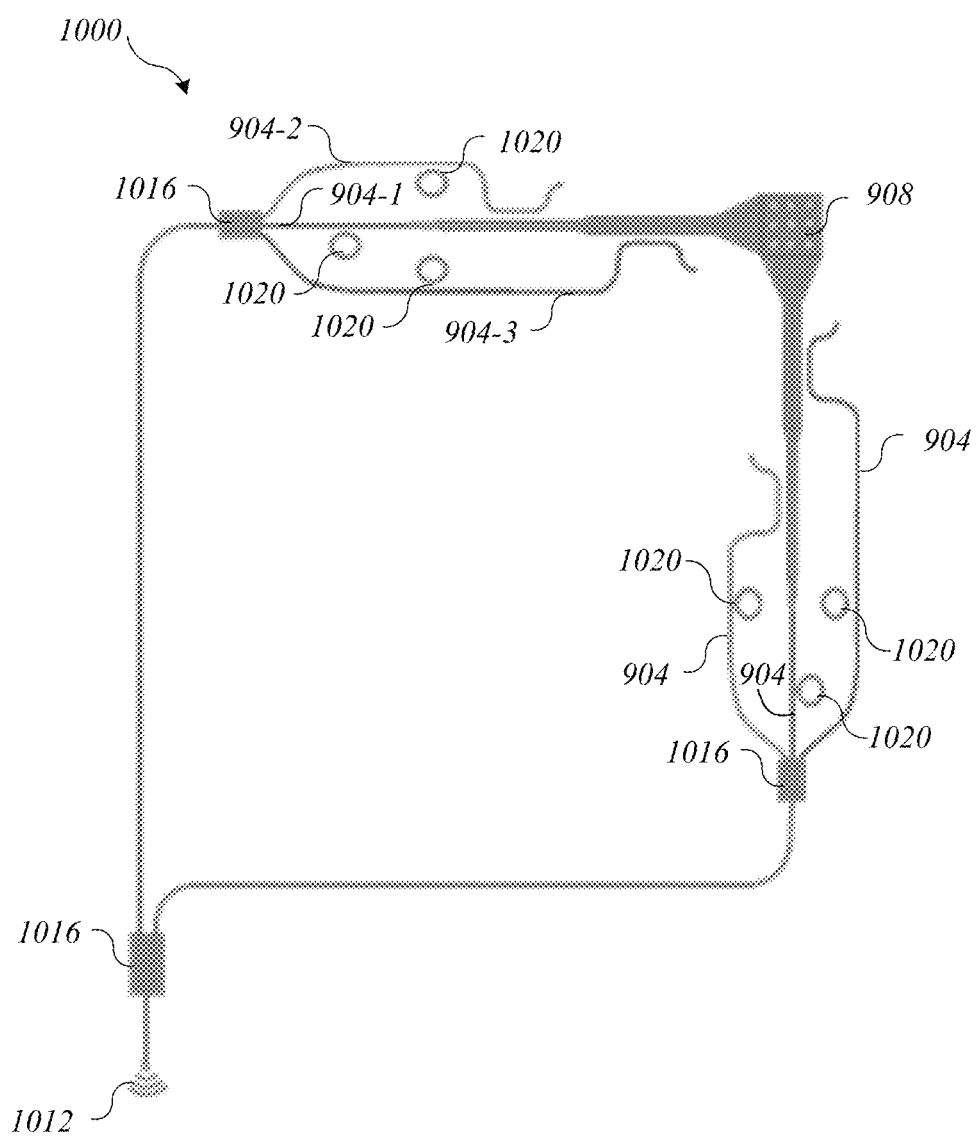
FIG. 10. A simplified diagram of an embodiment of a multiplexer having one optical input and modulating six optical signals.

Though there are many possible variations, three variations are described in further detail in FIGS. 9 and 10.

In some configurations, more than two optical beams can be coupled into one waveguide. In FIG. 9, a simplified diagram of an embodiment of a multiplexer 900 having three optical signals coupled into one waveguide is shown. The multiplexer 900 comprises a first waveguide 904-1, a second waveguide 904-2, a third waveguide 904-3, an output coupler 908, an first input 912-1, a second input 912-2, a third input 912-3, a first directional coupler 916-1, a second directional coupler 916-2, a first taper 920-1, a second taper 920-2, and a third taper 920-3.

A first optical signal is coupled into the first waveguide 904-1 by the first input 912-1; a second optical signal is coupled into the second waveguide 904-2 by the second input 912-2; and a third optical signal is coupled into the third waveguide 904-3 by the third input 912-3. The second waveguide 904-2 and the third waveguide 904-3 are single-mode waveguides. Light coupled into the first waveguide 904-1 is expanded using the first taper 920-1, the first taper 920-1 being configured to expand light propagating from the in the first waveguide 904-1 toward the first directional coupler 916-1. The first taper 920-1 is between the first directional coupler 916-1 and the first input 912-1.

The directional couplers 916 are asymmetric directional couplers. The first directional coupler 916-1 is configured to couple light from the second waveguide 904-2 into the first waveguide 904-1 (e.g., couple light from the second waveguide 904-2 into a higher-order mode than the fundamental mode of the first waveguide 904-1). A second taper 920-2 is configured to expand light propagating from the first directional coupler 916-1 to the second directional coupler 916-2 (e.g., expands light of both the first signal and the second signal). Tapers 920 are configured to expand light adiabatically.

The second directional coupler 916-2 is configured to couple light from the third waveguide 904-3 into the first waveguide 904-1. Light from the third waveguide 904-3 is coupled into the first waveguide 904-1 into a higher-order mode than the fundamental mode of the first waveguide 904-1 and/or into a higher-order mode than the mode of the second signal. A third taper 920-3 is configured to expand light propagating from the second directional coupler 916-2 toward the output coupler 908, the third taper 920-3 being between the output coupler 908 and the second directional coupler 916-2.

In some configurations, the multiplexer 900 can be duplicated, except for the output coupler 908, rotated 90°, and positioned to use the output coupler 908 (e.g., similar to orthogonal waveguides 104-1 and 104-2 in FIG. 1). Further, additional waveguides could be used to couple additional signals into the first waveguide 904-1 (e.g., a fourth waveguide could be used to couple a fourth signal into the first waveguide 904-1 through a third directional coupler and so on). In some embodiments, no more than two, three, or four signals coupled are into the first waveguide 904-1 so that signals are more easily demultiplexed (e.g., to reduce cross talk between modes).

Though embodiments in FIG. 1 and FIG. 9 show separate inputs (e.g., inputs 912 in FIG. 9) for each waveguide, fewer inputs than waveguides can be used (e.g., and signals modulated on chip). FIG. 10 is a simplified diagram of an embodiment of a multiplexer 1000 having one optical input and modulating six optical signals. The multiplexer 1000 comprises waveguides 904, an output coupler 908, an input 1012, splitters 1016, and modulators 1020. 1016.

Light is launched into the input 1012 and split into different waveguides 904 using splitters 1016. Light in each waveguide 904 is modulated using a modulator 1020. One example of a modulator 1020 is a ring resonator. A ring resonator can selectively couple light into a ring based on thermal modulation (or carrier injection) of the ring and/or of the waveguide 904, which changes an effective optical path length of the ring and coupling efficiency of light from a waveguide 904 into the ring. Thus optical signals are modulated on chip and there can be only one input (e.g., input 1012) for multiple optical signals.

VI. EXAMPLE PROCESS

Figure 11:
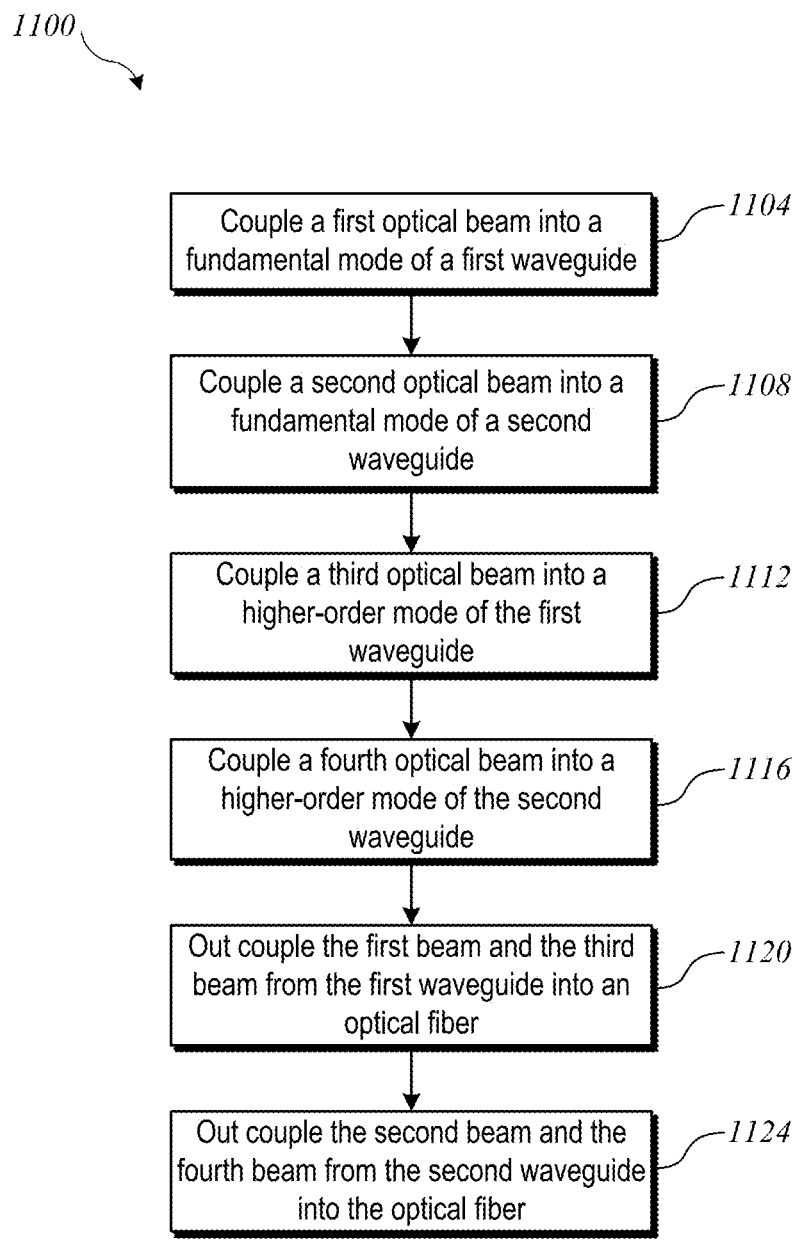
FIG. 11. A flowchart of an embodiment of a method for spatial multiplexing.

FIG. 11 depicts an embodiment of a flowchart of a method 1100 for spatial multiplexing. Method 1100 starts in step 1104 with coupling a first optical beam into a first waveguide. The first optical beam can be coupled into the first waveguide so that the first optical beam propagates in a fundamental mode of the first waveguide. For example, a first signal is coupled into the first waveguide 104-1 through the first input 112-1 in FIG. 1.

In step 1108, a second optical beam is coupled into a second waveguide. The second optical beam can be coupled into the second waveguide so that the second optical beam propagates in a fundamental mode of the second waveguide. For example, a second signal is coupled into the second waveguide 104-2 through the second input 112-2 in FIG. 1. The second waveguide is orthogonal to the first waveguide.

In step 1112, a third optical beam is coupled into the first waveguide. A first asymmetric directional coupler can be used to couple the third optical beam into the first waveguide so that the third optical beam propagates in a higher-order mode than the fundamental mode of the first waveguide. For example, a third signal is coupled into the first waveguide 104-1 using the first coupler 116-1 in FIG. 1.

In step 1116, a fourth optical beam is coupled into the second waveguide. A second asymmetric directional coupler can be used to couple the fourth optical beam into the second waveguide so that the fourth optical beam propagates in a higher-order mode than the fundamental mode of the second waveguide. For example, a fourth signal is coupled into the second waveguide 104-2 using the second coupler 116-2 in FIG. 1.

In step 1120, the first optical beam and the third optical beam are out coupled from the first waveguide into an optical fiber using a diffraction grating. The first waveguide has a width at the diffraction grating equal to or greater than 15 microns and equal to or less than 100 microns. For example, light from the first waveguide 104-1 is coupled out of the first waveguide 104-1 using the output coupler 108 in FIG. 1.

In step 1124, the second optical beam and the fourth optical beam are out coupled from the second waveguide into the optical fiber using the diffraction grating. The second waveguide has a width at the diffraction grating equal to or greater than 15 microns and equal to or less than 100 microns. For example, light from the second waveguide 104-2 is coupled out of the second waveguide 104-2 using the output coupler 108 in FIG. 1.

After the first, second, third, and fourth optical beams are coupled into the optical fiber, they are guided through the optical fiber to a demultiplexer where they are separated. A fifth optical beam can be coupled into the first waveguide using a third asymmetric directional coupler. For example, FIG. 9 shows a third signal coupled into the first waveguide 904-1 using the second directional coupler 916-2. And similarly, a sixth optical beam can be coupled into the second waveguide using a fourth asymmetric directional coupler.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "first", "second", "third", etc. are used to differentiate similar features and not necessarily meant to imply a sequential order.

What is claimed is:

1. A device for optical communication, comprising:
   a first waveguide configured to guide light to an output coupler, wherein:
   the first waveguide is a multimode waveguide configured to support a fundamental mode and a first-order mode;
   the fundamental mode and the first-order mode of the first waveguide are transverse modes;
   the first waveguide has a core formed of crystalline silicon; and
   the core of the first waveguide has a first width, measured at the output coupler, equal to or greater than 15 microns and equal to or less than 100 microns;
   a first directional coupler configured to adiabatically couple an optical signal into the first-order mode of the first waveguide, wherein the first directional coupler is asymmetric;
   a first taper, part of the first waveguide, between the first directional coupler and the output coupler, the first taper configured to adiabatically expand light propagating from the first directional coupler toward the output coupler;

a second waveguide, wherein:
  the second waveguide is a multimode waveguide configured to support a fundamental mode and a first-order mode;
  the fundamental mode and the first-order mode of the second waveguide are transverse modes;
  the second waveguide has a core formed of crystalline silicon;
  the core of the second waveguide has a second width, measured at the output coupler, equal to or greater than 15 microns and equal to or less than 100 microns; and
  the second waveguide is orthogonal to the first waveguide, such that the second width is orthogonal to the first width;
a second directional coupler configured to adiabatically couple an optical signal into the first-order mode of the second waveguide, wherein the second directional coupler is asymmetric;
a second taper, part of the second waveguide, between the second directional coupler and the output coupler, the second taper configured to adiabatically expand light propagating from the second directional coupler toward the output coupler; and
the output coupler comprising a grating, wherein:
  the grating comprises a layer of polycrystalline silicon contacting the core of the first waveguide;
  the grating comprises a plurality of walls forming holes in the core of the first waveguide;
  the grating is configured to couple light out of both the first waveguide and the second waveguide and into an optical fiber; and
  the output coupler is a vertical coupler so that light coupled out of the first waveguide and out of the second waveguide is perpendicular to beam propagation of light in the first waveguide and perpendicular to propagation of light in the second waveguide.

2. A device for optical communication, comprising:
a waveguide configured to guide light to an output coupler, wherein:
  the waveguide is a multimode waveguide configured to support a fundamental mode and a first-order mode;
  the fundamental mode and the first-order mode are transverse modes;
  the waveguide has a core formed of a semiconductor material; and
  the core has a width, measured at the output coupler, equal to or greater than 15 microns and equal to or less than 100 microns;
a directional coupler configured to adiabatically couple an optical signal into the first-order mode of the waveguide, wherein the directional coupler is asymmetric; and
the output coupler comprising a grating, wherein the grating is configured to couple light of both the fundamental mode and the first-order mode out of the waveguide into an optical fiber.

3. The device of claim 2, wherein the output coupler comprises:
a substrate;
a device layer; and
an insulating layer between the device layer and the substrate, wherein:
  the device layer comprises a plurality of teeth defining a plurality of grooves;
  the plurality of teeth and the plurality of grooves define a plurality of periods, wherein a period is a width of one tooth of the plurality of teeth and one groove of the plurality of grooves; and
  the plurality of periods have values that oscillate about an average width of the plurality of periods.

4. The device of claim 3, wherein the plurality of periods have values that are within +/−3% of the average width of the plurality of periods.

5. The device of claim 3, wherein a groove of the plurality of grooves is formed by a line of circles etched into the device layer.

6. The device of claim 2, wherein the semiconductor material comprises crystalline silicon.

7. The device of claim 6, the grating comprising a layer of polycrystalline silicon contacting the crystalline silicon.

8. The device of claim 2, wherein the grating comprises a plurality of walls in the semiconductor material forming holes in the semiconductor material.

9. The device of claim 2, further comprising a taper, which is part of the waveguide, between the directional coupler and the output coupler configured to adiabatically expand light propagating from the directional coupler toward the output coupler.

10. The device of claim 2, wherein:
the directional coupler is a first directional coupler;
the device further comprises a second directional coupler;
the second directional coupler is configured to adiabatically couple an optical signal into a higher-order mode of the waveguide;
the waveguide is configured to guide the higher-order mode;
the higher-order mode is higher than the first-order mode; and
the second directional coupler is asymmetric.

11. The device of claim 10, the device further comprising:
a first taper, which is part of the waveguide, between the second directional coupler and the output coupler, configured to expand light propagating from the second directional coupler toward the output coupler; and
a second taper, which is part of the waveguide, between the first directional coupler and the second directional coupler, configured to expand light propagating from the first directional coupler toward the second directional coupler.

12. The device of claim 2, wherein:
the waveguide is a first waveguide;
the device further comprises a second waveguide;
the second waveguide is configured to guide light to the output coupler;
the second waveguide is a multimode waveguide configured to support a fundamental mode and a first-order mode in the second waveguide; and
the output coupler is configured to couple light of both the fundamental mode and the first-order mode of the second waveguide out of the second waveguide and into the optical fiber.

13. The device of claim 12, wherein the first waveguide is orthogonal to the second waveguide.

14. The device of claim 12, wherein the output coupler is a vertical coupler so that light coupled out of the first waveguide and out of the second waveguide is perpendicular to beam propagation of light in the first waveguide and perpendicular to propagation of light in the second waveguide.

15. The device of claim 2, wherein the grating is configured to couple both the fundamental mode and the first-order mode out of the waveguide with an efficiency equal to or better than −7 decibels.

16. The device of claim 2, further comprising an input to couple an optical beam into a fundamental mode of the waveguide.

17. A method for multiplexing optical signals, comprising the steps of:
- coupling a first optical beam into a first waveguide so that the first optical beam propagates in a fundamental mode of the first waveguide;
- coupling a second optical beam into a second waveguide so that the second optical beam propagates in a fundamental mode of the second waveguide;
- coupling a third optical beam into the first waveguide, using a first asymmetric directional coupler, so that the third optical beam propagates in a higher-order mode than the fundamental mode of the first waveguide;
- coupling a fourth optical beam into the second waveguide, using a second asymmetric directional coupler, so that the fourth optical beam propagates in a higher-order mode than the fundamental mode of the second waveguide;
- out coupling the first optical beam and the third optical beam from the first waveguide into an optical fiber using a diffraction grating; and
- out coupling the second optical beam and the fourth optical beam from the second waveguide into the optical fiber using the diffraction grating, wherein the first waveguide has a width at the diffraction grating equal to or greater than 15 microns and equal to or less than 100 microns.

18. The method of claim 17, further comprising:
- adiabatically expanding light propagating from the first asymmetric directional coupler toward the diffraction grating; and
- adiabatically expanding light propagating from the second asymmetric directional coupler toward the diffraction grating.

19. The method of claim 17, further comprising:
- coupling a fifth optical beam into the first waveguide, using a third asymmetric directional coupler; and
- coupling a sixth optical beam into the second waveguide, using a fourth asymmetric directional coupler.

20. The method of claim 17, further comprising coupling light out of the diffraction grating in a direction orthogonal to beam propagation in the first waveguide.

\* \* \* \* \*